Feb. 14, 1956 C. E. TACK 2,734,255
MEANS FOR RESURFACING BRAKE ROTORS
Filed Jan. 22, 1952 2 Sheets-Sheet 2
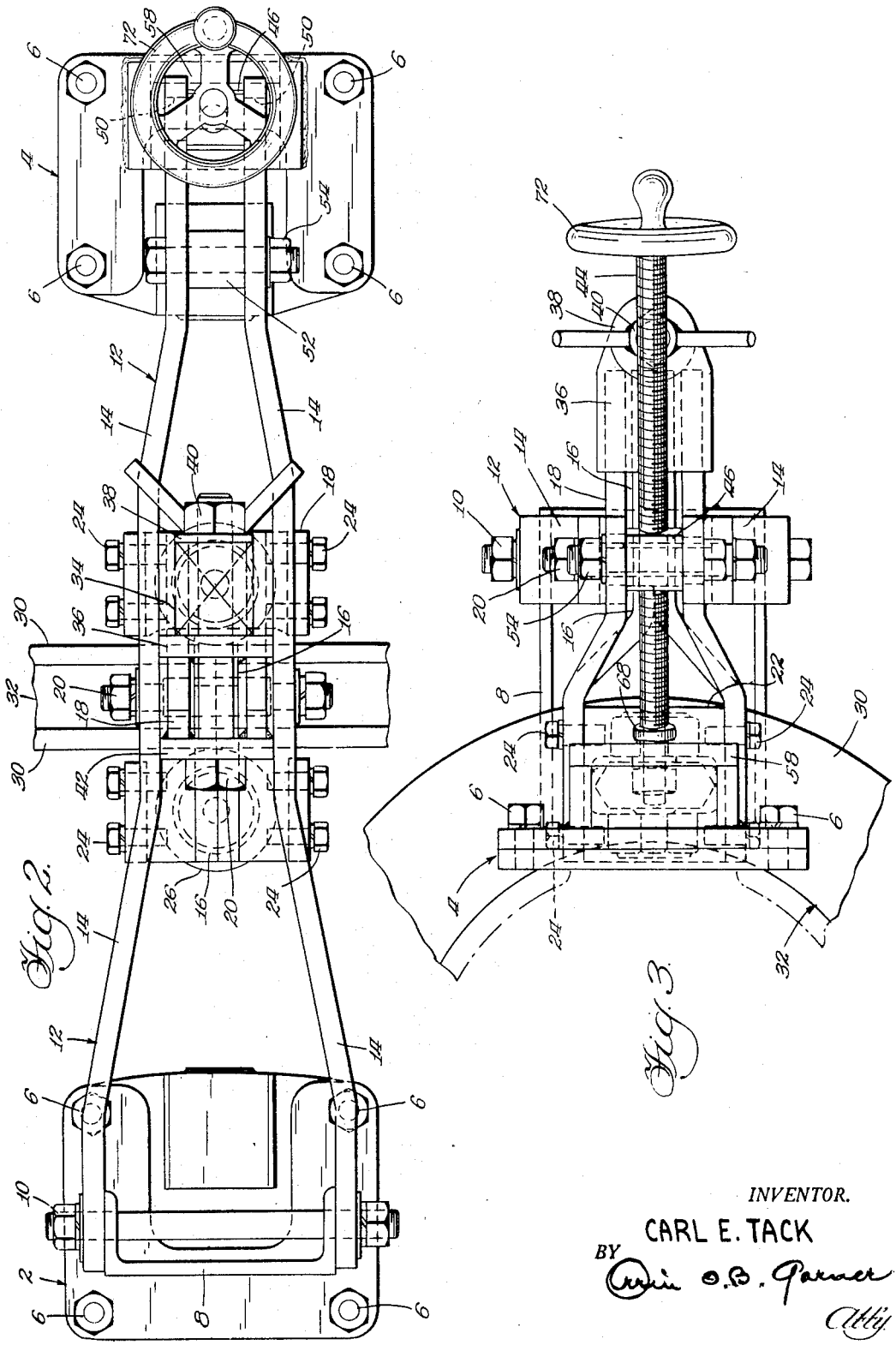
INVENTOR.
CARL E. TACK

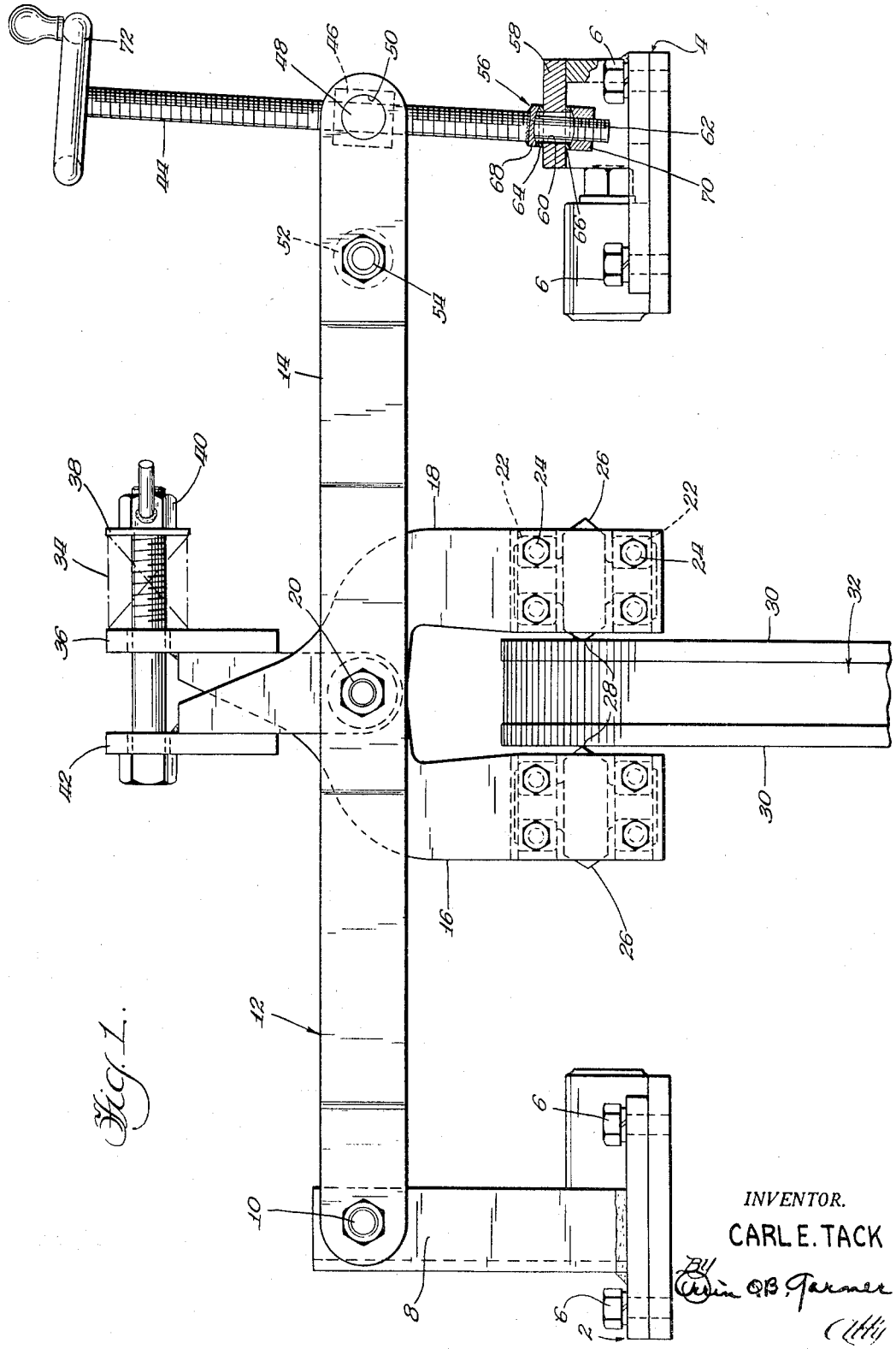

2,734,255

MEANS FOR RESURFACING BRAKE ROTORS

Carl E. Tack, Chicago, Ill., assignor to American Steel Foundries, Chicago, Ill., a corporation of New Jersey Application January 22, 1952, Serial No. 267,562

4 Claims. (Cl. 29—90)

This invention relates to brakes and more particularly to a novel method and means for increasing the service life of ferrous metal brake surfaces such as are commonly utilized in railway disc brakes of the type disclosed in my Letters Patent No. 2,355,122, issued August 8, 1944, by the United States Patent Office. The present application is a continuation-in-part of my copending application Serial No. 67,887, filed December 29, 1948, now abandoned.

In railway disc brakes of this type, a frequent cause of excessive maintenance costs and failures in service has been the cracking of the rotor friction surfaces which are engaged by brake shoes to decelerate the associated vehicle. Cracking of the rotor surfaces has generally been attributed to the tremendous amounts of energy dissipated and to the resultant high temperatures developed at the rotor friction surfaces, and many efforts have been made to design rotors having increased cooling efficiency and to provide means independent of the rotors for cooling their friction surfaces.

According to the present invention, it has been discovered that the service life of brake rotors may be greatly increased without the necessity of special cooling means, by intermittently treating the friction surfaces to restore compressive stresses therein which are lost due to upsetting of the metal as the result of heat developed during braking.

It has been found that frequent treatment of the friction surfaces, while beneficial, is not essential to the practice of the invention and greatly increased rotor life may be obtained by treating the metallic friction surfaces during truing of the tread surfaces of the wheels as, for example, every fifty thousand miles.

The most beneficial results have been obtained by applying rollers under pressure to the friction surfaces and in such manner as to accommodate rolling engagement between the friction surfaces and the rollers which are preferably moved back and forth between the inner and outer perimeters of the friction surfaces as the latter are rotated as, for example, during a wheel truing operation or during rotation of the wheel and axle assembly in service.

It has also been discovered that the most beneficial results are obtained by rotating the friction surfaces at such a rate that the rollers trace spiral paths across the surfaces as the rollers are moved toward and away from the rotational axis thereof.

It will be understood that the present invention is described in connection with the treatment of rotor friction surfaces in the yards. However, if desired, the method and apparatus hereinafter described may be utilized to treat the rotor surfaces under service conditions inasmuch as the brake shoes are applied to only a small portion of the friction surfaces leaving other portions available for treatment preferably between brake applications during rotation of the friction surfaces.

The foregoing and other objects and advantages of the invention will become apparent from a consideration of the following specification and the accompanying drawings, wherein:

Figure 1 is a top plan view, partly in section, of a preferred embodiment of the novel apparatus utilized in my invention;

Figure 2 is a front elevational view of the structure shown in Figure 1; and

Figure 3 is an end view taken from the right of Figure 1.

Describing the invention in detail, the novel apparatus comprises spaced brackets 2 and 4 which may be fixed to any convenient means of support such as a machine frame or the under carriage of a railway car by cap screws 6. The bracket 2 supports an arm 8 pivoted by a bolt and nut assembly 10 to a lever 12 comprising spaced top and bottom straps 14. A pair of levers 16 and 18 are received between the straps 14 and are pivoted thereto by a bolt and nut assembly 20. Each of the levers 16 and 18 carries a pair of conventional roller or ball bearing assemblies 22 secured by cap screws 24 and affording a rotatable mounting for a roller 26 tapered toward opposite sides thereof and adapted for rolling contact at 28 with an annular friction surface 30 of a conventional railway brake rotor 32 such as, for example, the type disclosed in my above mentioned patent.

The design of the rotor 32 is not pertinent to the present invention and, accordingly, this member is diagrammatically illustrated. However, it will be understood that the rotor is adapted to rotate on a substantially horizontal axis, as seen in the drawings.

The levers 16 and 18 are actuated to urge the rollers 26 into contact with the rotor surfaces 30 by means of a compression spring, diagrammatically illustrated at 34, one end of the spring being seated against an arm 36 of the lever 16 and the other end of the spring being seated against a spring plate or washer 38 of a bolt and nut assembly 40 extending through openings in the arm 36 and an arm 42 of the lever 18 whereby the reaction of the spring 34 against the levers 16 and 18 is equalized.

The rollers 26 are preferably harder than the friction surfaces 30 and are formed, for example, of case hardened steel adapted to burnish the surfaces 30 and restore the compressive stresses thereto.

The movable end of the lever 12 is provided with actuating means in the form of a screw 44 threaded into a traveling trunnion nut 46 having trunnion lugs 48 pivotally mounted in complementary openings 50 of the straps 14 which are maintained in proper spaced relationship by a spacer bushing 52 and a bolt and nut assembly 54 adjacent the movable end of the lever 12.

One end of the screw 44 is afforded a universal joint connection, generally designated 56, to a wall 58 of the bracket 4 which is provided with an opening 60 receiving a smaller diameter portion 62 of the screw 44 to accommodate angular movement thereof. A pair of washers 64 and 66 are seated against opposite sides of the wall 58, one of the washers being in complementary spherical face engagement with a collar 68 secured to the screw and the other washer being in complementary spherical face engagement with a securing nut 70 threaded on the portion 62 of the screw thereby accommodating such angular movement of the screw as may be necessitated by pivoting of the lever 12 about its fulcrum 10 or by irregularities in the rotor surfaces 30.

In the operation of the novel apparatus, with the rollers 26 applied to the rotor surfaces 30, as illustrated in the drawings, the lever 12 is rotated about its fulcrum 10 to move the roller back and forth between the radially inner and the radially outer perimeters of the surface 30, as best seen in Figure 3. The lever 12 is actuated, as illustrated in the drawings, by a hand wheel 72 on the screw 44; however, it will be understood that any suitable power means may be utilized to operate the screw 44.

The rotor 32 is preferably rotated at such a rate that the rollers 26 trace spiral paths across the surfaces 30 as the rollers move toward and away from the rotational axis thereof.

It will be understood that the beneficial results obtained in burnishing the rotor surfaces will vary with the load applied thereto by the rollers 26 and with the length of time of roller application.

I claim:

1. Apparatus of the class described comprising an actuator lever member having a pivotal axis, a pair of levers pivoted thereto, rollers mounted on corresponding ends of said levers for rotation relative thereto on approximately parallel axes extending lengthwise thereof and approximately perpendicular to the pivotal axis of said member, a spring connected to opposite corresponding ends of said levers for urging the first mentioned ends thereof together under equalized pressure, and means connected to said actuator member for pivoting the same on its axis to move the rollers in a path approximately parallel to said roller axes.

2. Apparatus of the class described comprising an actuator lever member having a pivotal axis, a pair of levers pivoted thereto, rollers carried by corresponding ends of said levers and rotatably mounted thereon for rotation on substantially parallel axes extending lengthwise of the levers, said axes being substantially perpendicular to the pivotal axis of said member, means connected to opposite corresponding ends of the levers for urging the first mentioned ends thereof toward each other, and means connected to the actuator member for oscillating the lever member on its pivotal axis to reciprocate the rollers in a path approximately parallel to their axes.

3. In apparatus for treating the radial friction surfaces of a brake rotor; the combination of spaced brackets, a fulcrum on one bracket, a lever pivotally connected to the fulcrum, means on the other bracket for pivoting the lever comprising a screw having a universal joint connection to the other bracket, and a traveling nut having a threaded connection to the screw and a pivotal connection to the lever on an axis approximately parallel to its pivotal axis, and means carried by the lever intermediate said brackets for burnishing said surfaces, said burnishing means comprising a pair of lever members pivoted to the lever on an axis approximately parallel to its pivotal axis, and rollers mounted on respective levers for rotation on axes approximately perpendicular to the last mentioned axis.

4. Apparatus, according to claim 3, wherein spring means are connected to said levers for clamping the rollers under approximately equal pressure against the friction surfaces of an associated brake rotor.

References Cited in the file of this patent

UNITED STATES PATENTS

| | | |
|---|---|---|
| 1,647,843 | Smith | Nov. 1, 1927 |
| 1,919,152 | Wilkins | July 18, 1933 |
| 2,043,481 | Krissiep et al. | June 9, 1936 |
| 2,606,360 | Fuller | Aug. 12, 1952 |